United States Patent
Kerr

[19]

[11] Patent Number: 5,932,317
[45] Date of Patent: Aug. 3, 1999

[54] DUST CONTROL MAT WITH CO-CALENDERED REINFORCING STRIPS

[75] Inventor: Robert Charles Kerr, LaGrange, Ga.

[73] Assignee: Milliken & Company, Spartanburg, S.C.

[21] Appl. No.: 08/265,926

[22] Filed: Jun. 27, 1994

[51] Int. Cl.⁶ .................................................. B32B 9/00
[52] U.S. Cl. ............................ 428/192; 428/15; 428/82; 428/85; 428/88; 428/91; 428/92; 428/95; 428/193; 428/194; 428/216; 264/175; 264/510; 264/552; 264/553; 156/437
[58] Field of Search ................................. 428/95, 88, 82, 428/85, 193, 194, 216, 91, 92, 192, 15; 264/243, 90, 175, 510, 552, 553; 156/437

[56] References Cited

U.S. PATENT DOCUMENTS

| | | |
|---|---|---|
| 1,730,657 | 10/1929 | Hogan . |
| 1,862,498 | 6/1932 | Stephens . |
| 2,001,575 | 5/1935 | James ............................................ 154/2 |
| 2,254,210 | 9/1941 | Cunnington ................................. 428/95 |
| 2,512,762 | 6/1950 | Benson et al. ........................... 154/1.75 |
| 3,849,174 | 11/1974 | Ancker ..................................... 117/65.2 |
| 3,953,631 | 4/1976 | Gordon ....................................... 428/95 |
| 3,956,551 | 5/1976 | Richards ..................................... 428/88 |
| 4,435,451 | 3/1984 | Neubert ...................................... 428/15 |
| 5,024,868 | 6/1991 | Petersen ..................................... 428/88 |

*Primary Examiner*—Deborah Jones
*Assistant Examiner*—Abraham Bahta
*Attorney, Agent, or Firm*—Terry T. Moyer; Earle R. Marden

[57] ABSTRACT

A method to produce a dust control mat with stronger longitudinal borders by co-calendering the rubber backing thereof with narrow strips of carboxylated nitrile rubber prior to formation of the dust control into a unitary product for use as a dust control mop.

11 Claims, 3 Drawing Sheets

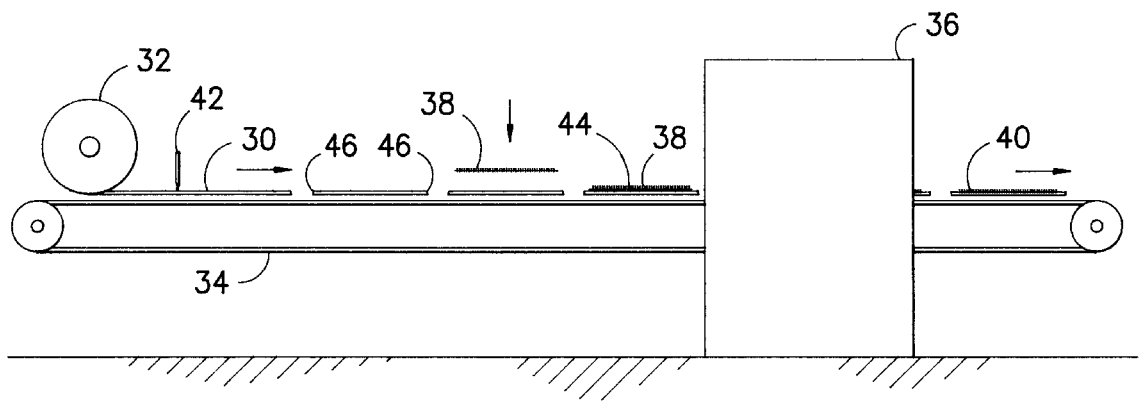
FIG. -1-
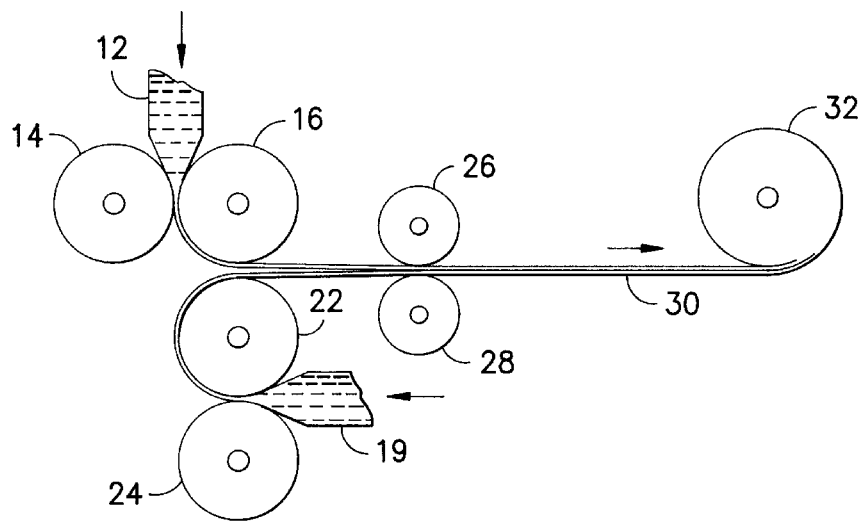
FIG. -2-
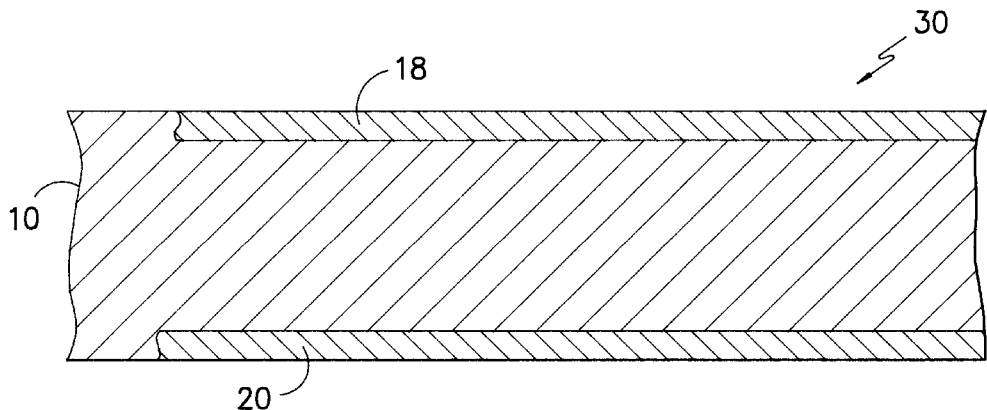
FIG. -3-

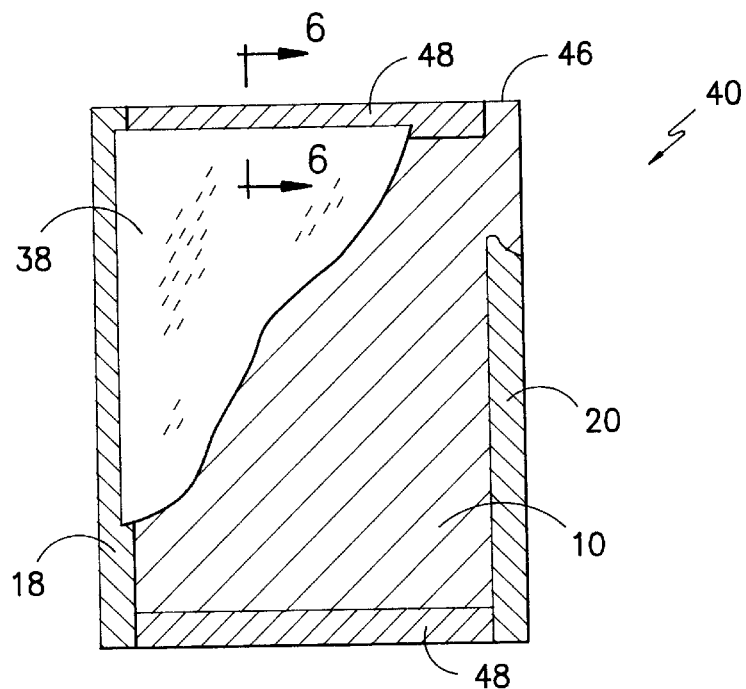
FIG. -4-
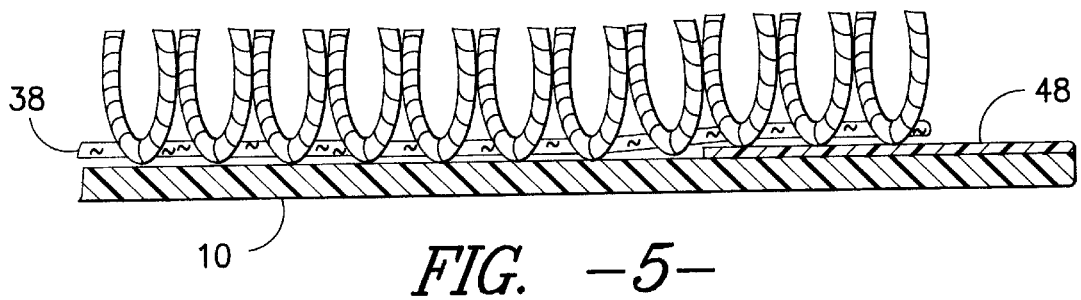
FIG. -5-
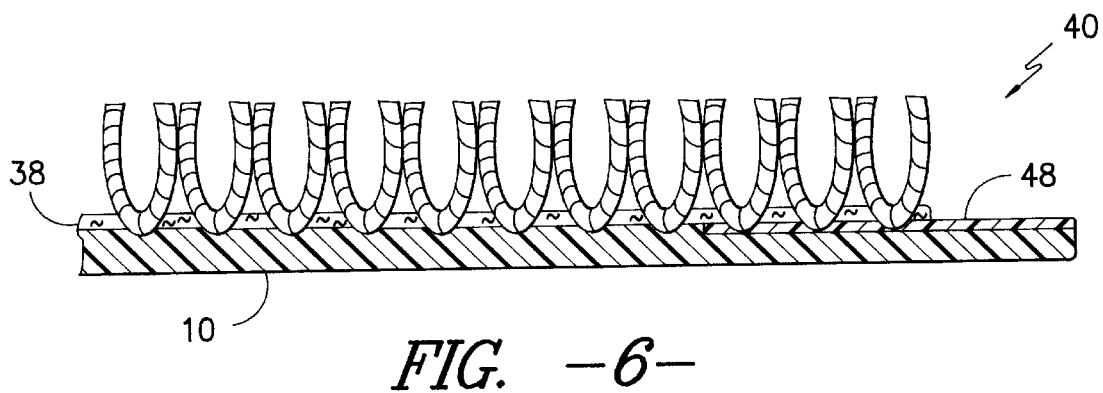
FIG. -6-

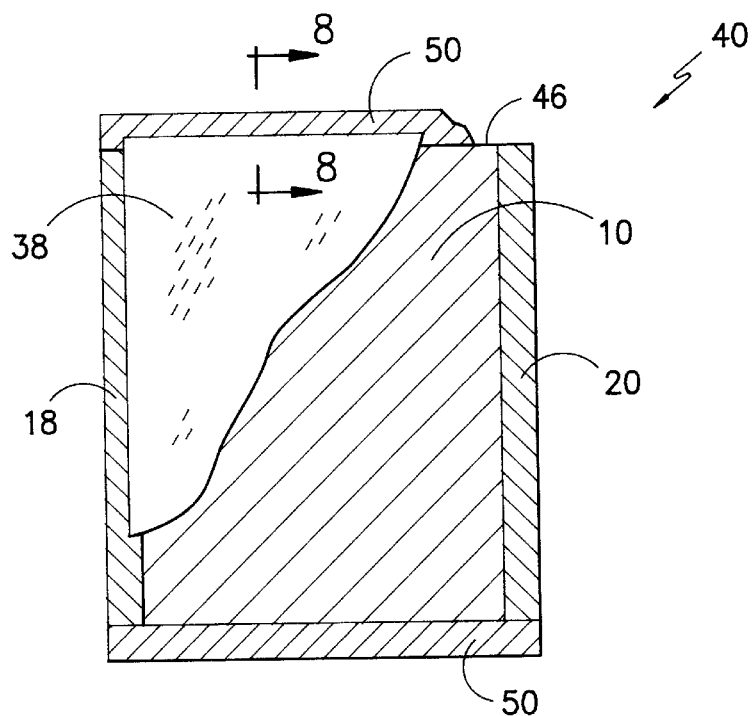
FIG. -7-
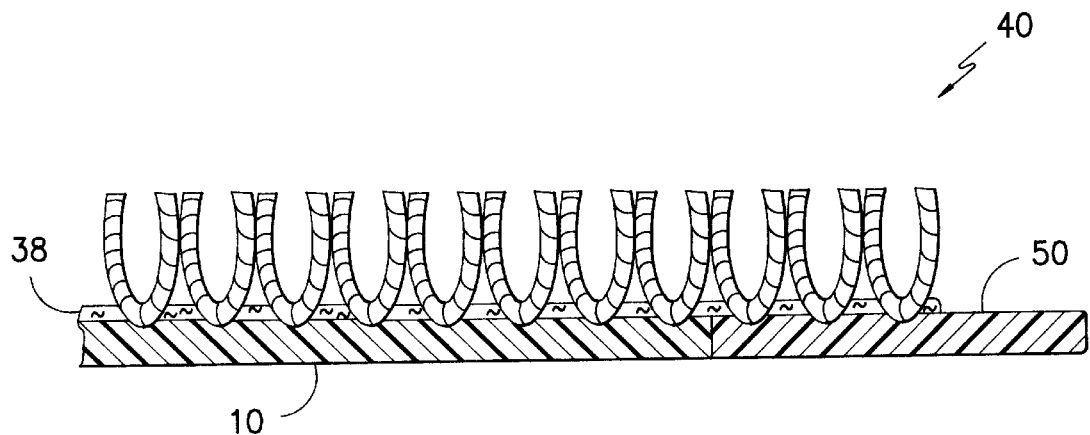
FIG. -8-

DUST CONTROL MAT WITH CO-CALENDERED REINFORCING STRIPS

This invention relates generally to rubber-backed dust control floor mats of the type which have a pile surface on one side and a rubber or rubber-like material on the other side. Mats of this type are generally used in access ways where people tend to brush or scrape their fee in order to prevent carrying of moisture and/or dirt, accumulated on their footwear, into other areas of the premises. Normally, these mats are located in areas of high pedestrian traffic, such as doorways. These mats are generally sold by the manufacturer to a rental laundry that, in turn, rents or leases such mats to the ultimate user.

BACKGROUND

During its practical use as a mat and its periodic wash and drying processing in industrial laundries, the main physical damage that occurs to a rubber back, press molded mat is the tearing of the longitudinal border. More often than not, this tear occurs at the edge of the textile referred to as the border interface on mats. Tearing of the leading edges on mats is incidental and will not be primarily addressed by this disclosure. However, the use of the laminate to be described can be placed across the leading ends of mat to minimize tearing.

Up until the present, the constructions of mats with respect to the rubber backing has been limited to the following methods:

1. The formulation of high tear and high tensile strength rubber in a uniform thick sheet (typically 59–65 mils) which extends beyond the dimensions of the textile fabric.
2. The construction of a five piece mat rubber backing which constitutes a uniform thick (typically 40–45 mils) sheet (body piece) smaller in dimensions than the textile fabric coupled with 4 strips of rubber (commonly twice as thick as the body piece) placed beneath the textile edges of the mat.

The vulcanization of rubber back, textile surfaced mats in a compression mold utilizing an inflatable diaphragm forces the longitudinal edges of the textile to embed deeper within the rubber compared to the other portion of the textile fabric. This embedding results from the unrestricted rubber movement in the border as the rubber passes through its minimum viscosity during vulcanization. The unrestrained movement of the rubber in the border allows the longitudinal edges of the textile to move deeper into the rubber backing creating a thinning of the rubber backing at the border interface. It is this thinner interface which is susceptible to tears during the mat's use and industrial laundry processing.

To avoid tearing of the rubber, mat construction has relied on the two previously described methods. Method #1 has the advantage of minimum labor requirements and minimal cycle times for curing. Also a mat is made with a uniform profile which minimizes tripping hazards. Method #2 overpowers the thinning area by doubling the rubber thickness to produce a resulting thickness comparable to that in the remaining portion of the mat. However, this five piece construction has a drawback of requiring extra labor and longer vulcanization times to cure the thicker rubber edges compared to the thinner body section beneath the textile. In addition, a mat with noticeably heightened borders is produced which is perceived to be a tripping hazard.

It is therefore an object of the invention to provide a method to produce a dust control mat which has reinforced longitudinal borders which have increased tearing strength and longer reuse life.

Other objects of the invention will become readily apparent as the specification proceeds to describe the invention with reference to the accompanying drawings in which:

FIG. 1 is a schematic representation of the method to produce the new and improved dust control mat;

FIG. 2 is a schematic representation of the system to produce the rubber or rubber-like backing material used in the method of FIG. 1;

FIG. 3 is a top view of the dust control backing material as it is unrolled from the supply roll in FIG. 1;

FIG. 4 is a top view of one form of dust control formed with pile free borders on all four sides;

FIG. 5 is a side view taken on line 6—6 of the dust control mat of FIG. 4 prior to vulcanization thereof;

FIG. 6 is a view taken of line 6—6 of FIG. 4;

FIG. 7 is a modification of the mat shown in FIGS. 4–6; and

FIG. 8 is a view taken on line 8—8 of FIG. 7.

The crux of the invention is directed to the provision of a backing material 10 of nitrile rubber or similar material which has a strip approximately 2" wide of carboxylated rubber co-calendered thereto on the longitudinal edges thereof to reinforce the edges of a dust control mat to which it is vulcanized.

It has been determined and demonstrated that with the use of a four roll rubber calender, that two rubber compounds can be co-calendered and laminated together without interruption of the material coming off of the calender. To illustrate this concept, FIG. 2 illustrates the use of an inverted L four roll calender to accomplish the co-calendering of two rubber formulas. Other four rolled configurations exist and lend themselves to the same result.

Upon examining FIG. 2, the sheet stock 12 of approximately 55 mils rubber thickness and widths of 36" and 48" is calendered between the top two rolls 14, 16. The 10 mil thick co-calendered reinforcing strips 18, 20 from stock 19 are lightly calendered beneath the two lower rolls 22, 24 of the inverted L. When the body stock and the two longitudinal strips emerge laminated between the roll nips, they are again re-laminated with an additional calender rolls 26, 28 placed adjacent to rolls 16, 22. The resulting co-calendered product 30 is then rolled up in conventional roll 32 form for use in making mats.

As shown schematically in FIG. 1, the roll 32 with the co-calendered rubber backing material 30 is placed above an endless conveyor 34 supplying the vulcanizer 36 to vulcanize the backing 30 to the tufted pile mat 38 placed thereon to produce the dust control mat 40. Initially the co-calendered backing is cut into suitable lengths by a cutter 42 of any desired type and then indexed to the next station where the tufted substrate 38 is placed thereon with the edges overlapping a portion of the co-calendered strips 18 and 20 as shown in FIGS. 4, 5 and 7. After the tufted substrate 38 has been placed properly on the backing material 32 the assembly 44 is indexed into the vulcanize same to produce the resultant dust control mat 40.

In its simplest form of the invention, the transverse cut edged 46 of the mat will not have a reinforced border but preferably, as shown in FIGS. 4–8, a border will be provided before vulcanization. FIGS. 4, 5, and 6 show one form of the invention wherein a 2" strip 48 of nitrile or carboxylated nitrile rubber approximately 0.010" thick is inserted between the longitudinally strips 18 and 20 on both the leading and tailing edges of the backing 30 and vulcanized thereto during the vulcanization step.

FIGS. 7 and 8 show another form of the invention where 2" wide, approximately 0.065" thick nitrile or carboxylated nitrile rubber strips 50 abut the leading and trailing edges 46 of the co-calendered backing 30 after it has been cut and vulcanized thereto as shown in FIG. 8.

Critical to the success of reinforcing the longitudinal borders is the rubber formula of the longitudinal stripped rubber. It has been determined that carboxylated nitrile rubber can achieve tensile strengths on the order of 3 to 4 times greater than conventional nitrile rubber. In addition, a higher mooney viscosity is required in the longitudinal strip of carboxylated formula to minimize penetration of the longitudinal edge of the textile into the reinforced border. When the resulting 55 mil body sheet and co-calendered 10 mil carboxylated strips are vulcanized in the sheet form to the textile fabric, the resulting mat has an imperceptible difference in body thickness across its entire width.

This is achieved because the border nitrile rubber movement is not restricted. The resulting longitudinal borders now have a tensile strength (from combining of 55 mil nitrile and 10 mil carboxylated nitrile) twice that of a pure nitrile rubber formula. Resulting tensile strengths of approximately 120 PSI is equivalent to the tensile strength of double thickness borders (90 to 120 mils) achieved in the five piece assembly described in the background information.

By developing a high tensile, high mooney viscosity, reinforcing strip and co-calendering to the nitrile rubber backing, a reinforced longitudinal edging can be applied in one step during mat fabrication prior to vulcanization in the press. Thus the advantages afforded by the five piece assembly, can be realized in the longitudinal borders by using the co-calendered nitrile and carboxylated nitrile strips.

In addition to the realized increase in tensile strength and mooney viscosity, carboxylated nitrile rubbers have demonstratively better abrasion resistance compared to conventional nitrile rubbers. The greater abrasion resistance realized in the longitudinal and leading edges of the mat allow the realization of a greater longevity of the rubber borders in minimal material loss compared to conventional nitrile rubber in comparative abrasion tests. Additionally, carboxylated rubbers (because of the carboxyl group saturation in the polymer) have a faster cure rate compared to conventional unsaturated nitrile rubber. This affords the use of a reinforcing border that can cure at the same rate as the body nitrile by overcoming the insulative influence of the conventional nitrile beneath the carboxylated borders. This results in allowing no increase in the vulcanization cycles.

As heretofore explained, the disclosed invention provides a dust control mat that has better tear resistance at the edges thereof resulting in a mat that has higher abrasion resistance and substantially higher tensile strength resulting in a longer service life before replacement.

I claim:

1. A dust control mat having a pile upper surface and a rubber backing material the improvement comprising narrow strips of nitrile rubber co-calendered to the longitudinal edges of the rubber backing to reinforce the longitudinal edges thereof.

2. The mat of claim 1 wherein said narrow strips are carboxylated nitrile rubber.

3. The mat of claim 2 wherein said strips are approximately 2" wide.

4. The mat of claim 2 wherein the leading and trailing edges of said backing material have additional strips of rubber material vulcanized thereto.

5. The mat of claim 4 wherein said additional strips are carboxylated nitrile rubber.

6. The mat of claim 5 wherein said additional strips lie between said longitudinal strips on said backing material.

7. The mat of claim 5 wherein said additional strips abut said co-calendered backing material.

8. The method of manufacturing a dust control mat comprising the steps of:

supplying a sheet of rubber material, laminating by calendering a narrow first strip of carboxylated nitrile rubber to the opposite longitudinal edges of said sheet, sequentially cutting said sheet into mat size segments, placing a tufted pile fabric on each of said segments after they are cut, supplying said tufted pile segments into a vulcanizer, vulcanizing said tufted pile segments to form a unitary mat and allowing said vulcanized mat to cool.

9. The method of claim 8 wherein a second strip of carboxylated nitrile rubber is placed at the leading and trailing edges of said segments after they have been cut from said sheet.

10. The method of claim 9 wherein said second strips abut the leading and trailing edges of said segments.

11. The method of claim 9 wherein said second strips are placed between said first strips on said segments adjacent the edges thereof.

\* \* \* \* \*